United States Patent
King et al.

(10) Patent No.: US 12,120,516 B2
(45) Date of Patent: Oct. 15, 2024

(54) DYNAMICALLY ENABLING A SECURITY FEATURE OF A WIRELESS COMMUNICATION DEVICE BASED ON ENVIRONMENTAL CONTEXT

(71) Applicant: MOTOROLA SOLUTIONS, INC., Chicago, IL (US)

(72) Inventors: Melanie A. King, Plantation, FL (US); Friedrich Bollmann, Birkenwerder (DE); Clarence Coffee, Pembroke Pines, FL (US); Divya Ramamoorthy, Cooper City, FL (US); David Weygandt, Hoffman Estates, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 372 days.

(21) Appl. No.: 17/553,373

(22) Filed: Dec. 16, 2021

(65) Prior Publication Data
US 2023/0199496 A1 Jun. 22, 2023

(51) Int. Cl.
*G06F 11/00* (2006.01)
*G06F 12/14* (2006.01)
(Continued)

(52) U.S. Cl.
CPC .................... *H04W 12/12* (2013.01)

(58) Field of Classification Search
CPC .................................................. H04W 12/12
(Continued)

(56) References Cited

U.S. PATENT DOCUMENTS 6,144,693 A   11/2000   Tabeta
8,301,075 B2  10/2012   Sherman et al.
(Continued)

FOREIGN PATENT DOCUMENTS

WO   2018068428 A1   4/2018

OTHER PUBLICATIONS

Sheyner, "After police encrypt radios, City Council looks for ways to restore transparency," Palo Alto Online, <https://www.paloaltoonline.com/news/2021/04/06/city-council-not-sold-on-police-radio-encryption> dated Apr. 6, 2021.

*Primary Examiner* — Brandon Hoffman
*Assistant Examiner* — Samuel Ambaye
(74) *Attorney, Agent, or Firm* — Michael Best & Friedrich LLP (57) ABSTRACT

Wireless communication device and methods for operating the same. One wireless communication device includes an electronic processor configured to operate the wireless communication device in a first security mode of a plurality of available security modes. The electronic processor is also configured to evaluate one or more environmental context parameters associated with the wireless communication device, determine, based on the environmental context parameters, whether communications of the wireless communication device are susceptible to a potential cyber-security threat, and, in response to determining the communications of the wireless communication device are susceptible to the potential cyber-security threat, transition the wireless communication device to a second security mode of the plurality of available security modes to determine whether the potential cyber-security threat is present, wherein at least one selected from a group consisting of the frequency scanning feature and the frequency hopping feature is enabled in the second security mode.

20 Claims, 4 Drawing Sheets

(51) Int. Cl.
    *G06F 12/16* (2006.01)
    *G08B 23/00* (2006.01)
    *H04W 12/12* (2021.01)
(58) Field of Classification Search
    USPC .......................................................... 726/25
    See application file for complete search history.

(56) References Cited

U.S. PATENT DOCUMENTS

| | | |
|---|---|---|
| 10,354,169 B1 | 7/2019 | Law et al. |
| 10,999,309 B2 | 5/2021 | Drummond et al. |
| 2010/0091818 A1* | 4/2010 | Sen ........................ H04B 1/715 |
| | | 375/136 |
| 2016/0330069 A1 | 11/2016 | Nordmark et al. |
| 2017/0270295 A1* | 9/2017 | Park ...................... G06F 21/552 |

* cited by examiner

DYNAMICALLY ENABLING A SECURITY FEATURE OF A WIRELESS COMMUNICATION DEVICE BASED ON ENVIRONMENTAL CONTEXT

BACKGROUND OF THE INVENTION

Wireless communication devices include several features that allow the devices to communicate with other systems and devices. These features, while advancing connectivity, create opportunities for cyber-security attacks. To address these attacks, wireless communication devices may be equipped with one or more security features to detect or prevent cyber-security attacks. For example, a wireless communication device may include one or more security features to detect and prevent message interception. Implementing these security features, however, increases complexity, increases latency, and increases power consumption, which may degrade the performance of a wireless communication device. Accordingly, these security features may be manually disabled.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted above, although communication devices are often equipped with security features, these features may cause increased latency and battery consumption and, as such, are often manually disabled. Embodiments described herein dynamically enable and disable one or more security features of a wireless communication device based on one or more environmental context parameters, which results in improved battery consumption and reduced latency.

For example, one embodiment described herein provides a wireless communication device comprising an electronic processor. The electronic processor is configured to operate the wireless communication device in a first security mode of a plurality of available security modes, wherein a frequency scanning feature and a frequency hopping feature of the wireless communication device are disabled in the first security mode. The electronic processor is also configured to evaluate one or more environmental context parameters associated with the wireless communication device, and determine, based on the evaluated one or more environmental context parameters, whether communications of the wireless communication device are susceptible to a potential cyber-security threat. The electronic processor is further configured to, in response to determining the communications of the wireless communication device are susceptible to the potential cyber-security threat, transition the wireless communication device to a second security mode of the plurality of available security modes to determine whether the potential cyber-security threat is present, wherein at least one selected from a group consisting of the frequency scanning feature and the frequency hopping feature is enabled in the second security mode.

Another embodiment provides a method of operating a wireless communication device. The method includes operating, with an electronic processor included in the wireless communication device, the wireless communication device in a first security mode of a plurality of available security modes, wherein a frequency scanning feature and a frequency hopping feature of the wireless communication device are disabled in the first security mode, and evaluating, with the electronic processor, one or more environmental context parameters associated with the wireless communication device. The method also includes, determining, with the electronic processor, based on the evaluated one or more environmental context parameters, whether communications of the wireless communication device are susceptible to a potential cyber-security threat, and, in response to determining the communications of the wireless communication device are susceptible to the potential cyber-security threat, transitioning, with the electronic processor, the wireless communication device to a second security mode of the plurality of available security modes to identify whether the potential cyber-security threat is present, wherein the frequency scanning feature is enabled and the frequency hopping feature being disabled in the second security mode. The method further includes performing, with the electronic processor while the wireless communication device operates in the second security mode, a frequency scan, and, in response to detecting the potential cyber-security threat from the frequency scan, transitioning, with the electronic processor, the wireless communication device to a third security mode of the plurality of available security modes, wherein the frequency hopping feature is enabled in the third security mode.

Yet another embodiment provides a non-transitory computer-readable medium storing instructions, that when executed by an electronic processor, perform a set of functions. The set of functions includes operating a wireless communication device in a first security mode of a plurality of available security modes, evaluating, based on sensor data, one or more environmental context parameters associated with the wireless communication device, and determining, based on the evaluated one or more environmental context parameters, whether communications of the wireless communication device are susceptible to a potential cyber-security threat. The set of functions also includes, in response to determining the communications of the wireless communication device are susceptible to the potential cyber-security threat, transitioning the wireless communication device to a second security mode of the plurality of available security modes, wherein a frequency scanning feature of the wireless communication device is enabled in the second security mode. The set of functions further includes performing a frequency scan while operating the wireless communication device in the second security mode to identify whether the potential cyber-security threat is present, and automatically and selectively operating the wireless communication device in one of three security modes included in the plurality of available security modes based on the one or more environmental context parameters and a result of the frequency scan. The three security modes include (i) the second security mode, (ii) a third security mode, a frequency hopping feature of the wireless communication device being enabled and the frequency scanning feature being disabled in the third security mode, and (iv) a fourth security mode, the frequency hopping feature and the frequency scanning feature being enabled in the fourth security mode.

Figure 1:
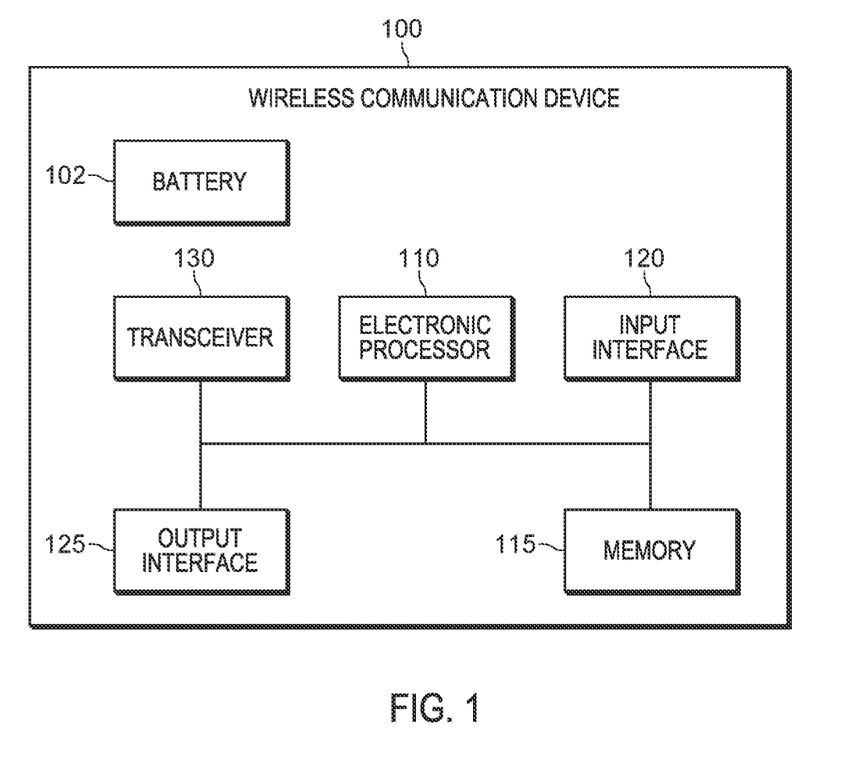
FIG. 1 is a block diagram of a wireless communication device in accordance with some embodiments.

FIG. 1 is a block diagram of a wireless communication device 100 configured to exchange messages over a wireless communication network in accordance with some embodiments. The wireless communication device 100 may be a portable, mobile, or stationary communication device. When portability is desired, the wireless communication device 100 may be a mobile telephone, a smart telephone, a smart watch, a tablet computer, a portable radio, or similar device.

The wireless communication device 100 may operate within or over various wireless communication networks and communication links. For example, the wireless communication device 100 may communicatively couple to a cellular network, a land mobile radio network, a trunked radio network, a wireless local area network (for example, a Wi-Fi© network), a short-range wireless network, or a combination of the foregoing. The wireless communication device 100 may also communicate directly with other devices. For example, the wireless communication device 100 may be configured to communicatively link to other devices via various forms of radio frequency (RF) communications or short-range wireless interconnection (for example, via Bluetooth® or Bluetooth® Low Energy (BLE) technology). In some embodiments, the wireless communication device 100 communicates over a public safety communication network supporting a plurality of communication devices associated with one or more public safety agencies, such as, for example, a police department or first responders.

The wireless communication device 100 includes a plurality of electrical and electronic components that provide power, operational control, and protection to the components and modules within the wireless communication device 100. For example, in some embodiments, the wireless communication device 100 includes a rechargeable battery 102 for powering components and modules within the wireless communication device 100.

As illustrated in FIG. 1, the wireless communication device 100 also includes an electronic processor 110 (for example, an electronic microprocessor, microcontroller, or similar device), a memory 115 (for example, non-transitory, computer-readable memory), an input interface 120, an output interface 125, and a transceiver 130. The wireless communication device 100 may include additional or alternative components, including additional electronic processors and memory, or application specific integrated circuits (ASICs).

The components of the wireless communication device 100 may be connected in various ways including, for example, a local bus. The electronic processor 110 is communicatively coupled to the memory 115 and executes instructions stored on the memory 115. The electronic processor 110 is configured to retrieve from the memory 115 and execute, among other things, instructions related to the control processes and methods described herein.

The input interface 120 includes one or more input mechanisms, and the output interface 125 includes one or more output mechanisms. In some embodiments, the input interface 120 includes a microphone for receiving audio (voice) data and the output interface 125 includes a speaker for outputting audio data. Alternatively or in addition, the input interface 120 may include one or more buttons, dials, or other physical mechanisms for receiving input from a user. The input interface 120 may also include a touchscreen that also operates as the output interface 125. For example, the wireless communication device 100 may include a touchscreen configured to receive input representing selections made via the touchscreen and to display or output data and graphical elements.

The transceiver 130 is configured to transmit data to and receive data from one or more devices, networks, or systems external to the wireless communication device 100, such as, for example, a wireless communication network.

Figure 2:
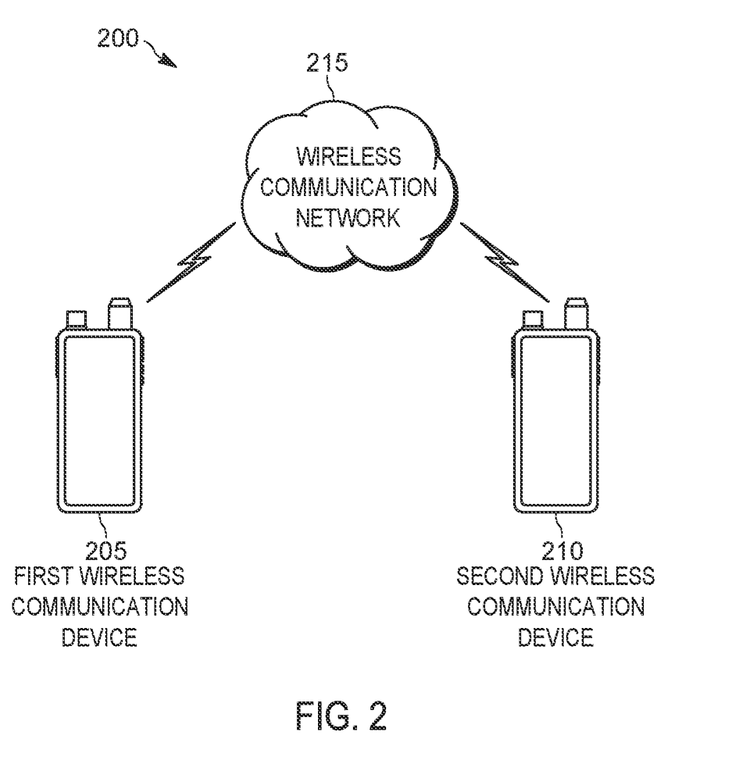
FIG. 2 is a block diagram of a wireless communication system in accordance with some embodiments.

FIG. 2 illustrates a wireless communication system 200 in accordance with some embodiments. As illustrated in FIG. 2, the wireless communication system 200 includes a first wireless communication device 205 (also referred to herein as "the device 205") and a second wireless communication device 210 (also referred to herein as "the device 210") communicating over a wireless communication network 215. The wireless communication network 215 may be implemented using wireless communication components and may include various wireless networks or interconnections, such as, for example, a cellular network (such as, for example, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, or a 5G network), a land mobile radio network, a trunked radio network, a wide area network (such as, for example, the Internet), a local area network (such as, for example, a Wi-Fi© network), a short-range wireless network or connection (such as, for example, a Bluetooth© connection), or a combination of the foregoing.

In some embodiments, the wireless communication system 200 is a system of wireless communication devices of the type illustrated in FIG. 1. For example, the wireless communication devices 205 and 210 may each be structured similar to and operate similar to the wireless communication device 100 described above. Thus, for the sake of brevity, the electronic processor, memory, input interface, output interface, and other components of the first and second wireless communication devices 205 and 210 are not described in detail, but it will be appreciated that, when referenced in the following description, each wireless communication device 205 and 210 includes at least the components of the wireless communication device 100 illustrated in FIG. 1.

The wireless communication system 200 may include fewer or additional wireless communication devices, and the two wireless communication devices 205 and 210 illustrated in FIG. 2 are provided as one illustrative example of the system 200. In addition, the wireless communication system 200 may include other components, such as for example, firewalls, routers, and the like not described herein. Furthermore, the wireless communication system 200 may include wireless communication devices of same type, of different types, or a combination thereof. For example, FIG. 2 illustrates the first and second wireless communication devices 205 and 210 as radios, in other embodiments, the first wireless communication device 205 may be a radio and the second wireless communication device 210 may be a telephone.

The first wireless communication device 205 includes one or more security features. In one embodiment, the first wireless communication device 205 includes an encryption feature, a frequency scanning feature, and a frequency hopping feature. Depending on which of these features are enabled, the first wireless communication device 205 is configured to operate in one of a plurality of security modes. In one embodiment, the plurality of security modes includes an encryption mode, a frequency scanning mode, a frequency hopping mode, and a frequency scanning and hopping mode. In some embodiments, the plurality of security modes also includes a disabled mode, wherein at least the frequency scanning feature and the frequency hopping feature of the first wireless communication device 205 are disabled. In other embodiments, different numbers and types of security modes may be used.

In the encryption mode, the encryption feature is enabled, which encrypts data (for example, messages) transmitted by the first wireless communication device 205. The encryption may be performed by the electronic processor 110 or a separate processor or module included in the first wireless communication device 205. In some embodiments, the encryption applied via the encryption feature includes Wi-Fi Protected Access (WPA) encryption, Wi-Fi Protected Access Version 2 (WPA2) encryption, Cellular Message Encryption (CME), P25 encryption, public key encryption, DMR encryption, Data Encryption Standard (DES) encryption, or Advanced Encryption Standard (AES) encryption.

In the frequency scanning mode, the frequency scanning feature is enabled, which scans one or more frequencies at a predetermined frequency to listen for activity indicating an unauthorized device is present within the wireless communication system 200. The frequency scanning feature may be associated with a scanning profile and a frequency. The scanning profile, the frequency, or both may be stored on the first wireless communication device 100 (such as, for example, the memory 115). The scanning profile defines the frequencies scanned via the frequency scanning feature and the frequency defines the frequency or rate at which the frequencies are scanned. The frequency scanning may be performed by the electronic processor 110 or a separate processor or module included in the first wireless communication device 205.

In some embodiments, the frequency hopping feature of the first wireless communication device 205 is disabled in the frequency scanning mode. Also, in some embodiments, the frequency scanning mode does not modify or control (enable or disable) the encryption feature. For example, when the device 205 transitions from the encryption security mode (where the encryption feature is enabled) to the frequency scanning mode, the encryption feature remains enabled in the frequency scanning mode. In contrast, when the device 205 transitions from the disabled security mode to the frequency scanning security mode, the encryption feature remains disabled in the frequency scanning mode.

In the frequency hopping mode, the frequency hopping feature is enabled. Frequency hopping includes changing a carrier frequency of messages transmitted by the first wireless communication device 205 among frequencies within a spectral band. Frequency hopping prevents or mitigates interception of messages by unauthorized receivers. In some embodiments, as part of the frequency hopping feature, voice channel switching is also performed.

In some embodiments, the frequency scanning feature of the first wireless communication device 205 is disabled in the frequency hopping mode. Also, in some embodiments, the frequency hopping mode, similar to the frequency scanning mode, does not modify the encryption feature.

In the frequency scanning and hopping mode, both the frequency scanning feature and the frequency hopping feature are enabled and perform as described above with respect to the frequency scanning mode and the frequency hopping mode. In some embodiments, frequency scanning performed within the frequency scanning and hopping mode differs from frequency scanning performed within the frequency scanning mode. For example, as described in more detail below, the device 205 may transition to the frequency scanning and hopping mode in response to detecting a high level or risk or threat of a cyber-security attack. Accordingly, in the frequency scanning and hopping mode, frequency scanning may be performed at an increased frequency, for an extended range of frequencies, for a different set of frequencies, or a combination thereof as compared to scanning performed in the frequency scanning mode. Similarly, in some embodiments, the frequency hopping performed as part of the frequency scanning and hopping mode may differ from frequency hopping performed as part of the frequency hopping mode. For example, as compared to frequency hopping occurring in the frequency hopping mode, frequency hopping performed as part of the frequency scanning and hopping mode may involve more frequent or more drastic frequency changes. Similarly, in some embodiments, frequency hopping performed as part of the frequency scanning and hopping mode may involve voice channel switching. Also, as described above with respect to the frequency scanning mode and the frequency hopping mode, the frequency scanning and hopping mode may not modify or control the encryption feature.

The first wireless communication device 205 is configured to transition between security modes based on one or more environmental context parameters associated with the device, which may be evaluated by the device 205 based on sensor data, data received from one or more external systems or devices, stored data (for example, configuration settings), or a combination thereof. In some embodiments, the one or more environmental context parameters include a current location of the first wireless communication device 205, a role of a user associated with the device 205, an incident type, voice data received via the input interface 120 of the device 205, a current time of day, a current time of the year, an existence of a known cyber-security attack, a current state of the battery 102 of the device 205, or a combination or subset thereof. It will be appreciated that the one or more environmental context parameters considered when transitioning to a particular security mode may vary and, in some embodiments, additional parameters, such as, for example, results of a frequency scan, may also be used when determining when to transition from one security mode to another security mode.

The current location of the first wireless communication device 205 may be determined based on data received via a satellite location receiver (such as, for example, a Global Positioning System (GPS) receiver) included in the device 205. Alternatively or in addition, the current location of the device 205 may be determined based on location data received from other services or applications executed by the device 205, such as, for example, location data received from the wireless communication network 215 (for example, a Wi-Fi® network or a cellular network).

The role of a user associated with the first wireless communication device 205 may be determined based on login information or an associated user profile stored in the device 205 (for example, the memory 115) or external to the device 205. The role may indicate an agency, a title, or both of a user, such as, for example, whether the user is a police officer, a member of a SWAT team, an FBI analyst, or the like. The user role may be directly determined based on stored data or may be inferred from various settings, applications, data, or activities performed via the device 205. For example, user privileges configured for the device 205 may indirectly specify whether a user is a police officer or a police chief or commander.

The incident type may be determined based on dispatch data received from a dispatcher associated with a public safety agency. Alternatively or in addition, the device 205 may store or have access to a list of active incidents and may determine (for example, based on a current location of the device 205) a relevant incident associated with the device 205. In some embodiments, the type of the incident may categorize the incident, such as, for example, whether the incident is a weather incident, a traffic incident, a grid incident, a crowd incident, or the like.

The voice data received via the input interface 120 may include a voice command, a message, or other input or selection made by a user. This audio data may be analyzed using audio analytics, such as, for example, speech-to-text conversion, natural language processing, or both at the device 205 or via a remote service provided to the device 205.

The current time may be determined based on data received as part of the location data described above. In other embodiments, a current time may be determined based on information provided by the wireless communication network 215 or otherwise maintained internally by the first wireless communication device 205.

The existence of a known cyber-security attack may be determined by accessing a database or report of detected cyber-security attacks (in or around a current location of the device 205). This data may be stored on the first wireless communication device 205 or accessible by the device 205 from an external device, such as an insights or analytics service or application provided via a public service agency. In some embodiments, to initially build data regarding reported or detected cyber-security attacks, the first wireless communication device 205 may be configured to randomly or on a predetermined schedule enable the frequency scanning feature to perform a scan and collect data regarding unauthorized intrusion or interception. The device 205 reports the results of such a scan to a centralized device or service, such as an insights or analytics service, which may use the scan results (in combination with one or more environmental context parameters of the device 205 when the scan was performed, such as, for example, time and location) to creates data structures or reports (for example, a heatmap) that identify locations or types of locations currently or historically associated with cyber-security attacks, times of day historically associated with cyber-security attacks, times of year historically associated with cyber-security attacks, types of incidents historically associated with cyber-security attacks, or a combination thereof. Data regarding existing or previous cyber-attacks may also be collected from news sources or other government agencies. The collected data and associated data structures and reports may, in some embodiments, be used to configure rules controlling transitions between security modes as described herein.

The current state of the battery of the device 205 may be determined based on data received from one or more sensors, switches, or other power management components included in the first wireless communication device 205. In some embodiments, the current state of the battery includes a current state of charge of the battery, a current temperature of the battery, a current charging state of the battery, a last charge time of the battery, a current power consumption rate of the battery, or a combination thereof.

The one or more environmental context parameters are evaluated based on one or more rules, which may be stored on the first wireless communication device 205 (for example, within the memory 115) or an external device. The rules may be manually programmed, such as by a network administrator, to define a set of environmental context parameters associated with a particular transition between security modes. In some embodiments, the rules may be customized for a particular device, user, user role, agency, or a combination thereof, and, in some embodiments, rules may be automatically updated based on feedback, such as, for example, feedback from a user or administrator or feedback regarding actual cyber-security attacks. For example, as noted above, results of frequency scans may be collected by an insights or analytics service, which may be used to establish or update rules for when to transition between security modes. In some embodiments, one or more machine learning techniques may also be used to learn rules identifying contexts associated with potential threats or particular threat levels. In general, a stored rule may define one or more conditions that must be satisfied by one or more environmental context parameters to trigger enablement of a particular security feature (transition to a particular security mode).

Figure 3:
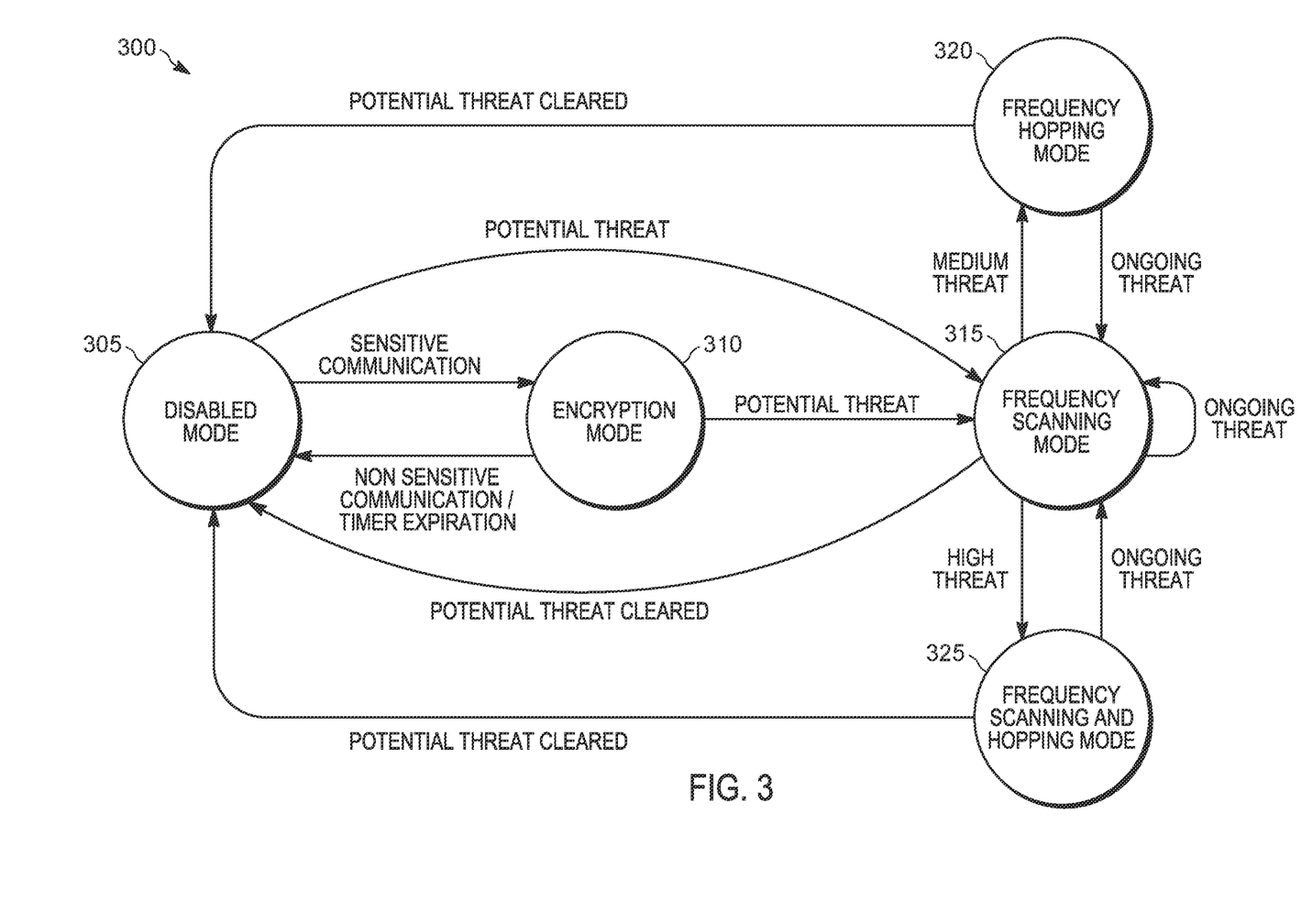
FIG. 3 illustrates a plurality of security modes of the wireless communication device of FIG. 1 in accordance with some embodiments.

FIG. 3 schematically illustrates the plurality of security modes of the first wireless communication device 205 and transitions between the modes in accordance with some embodiments. In some embodiments, when the first wireless communication device 205 is powered on, the device 205 starts in the disabled mode 305. From the disabled mode 305, the first wireless communication device 205 may transition to another mode based on one or more environmental context parameters determined by the device 205.

For example, as illustrated in FIG. 3, when the first wireless communication device 205 is in the disabled mode 305, the device 205 transitions to the encryption mode 310 based on the one or more environmental context parameters. In particular, when the one or more environmental context parameters indicate that data transmitted by the device 205 may be sensitive, the device 205 may transition to the encryption mode 310. The rules and associated conditions associated with this transition may vary to customize encryption for particular devices, users, agencies, or the like. However, in some embodiments, the transition may be based on voice data received via the input interface 120 of the device 205, a user role, an incident type, or a combination thereof. For example, keywords or phrases identified within analyzed voice data may indicate that sensitive data is being transmitted. As one non-limiting example, when the first wireless communication device 205 is being used within a public safety communication system and the device 205 receives a voice command regarding checking a license plate, a driver's license, an identity, or the like, the device 205 may transition to the encryption mode 310 since this command is likely associated with the transmission of personal or sensitive information. Similarly, particular user roles may be considered more likely to be transmitting sensitive data than other user roles and particular types of incidents may be considered more likely to be associated with transmission of sensitive data.

As illustrated in FIG. 3, when the first wireless communication device 205 is in the disabled mode 305 or the encryption mode 310, the device 205 may transition to the frequency scanning mode 315 in response to detecting a potential threat. The potential threat may be identified using the same or different environmental context parameters used when determining whether to transition to the encryption mode 310. In some embodiments, the first wireless communication device 205 transitions to the frequency scanning mode 315 based on a location of the device 205, a user role, an incident type, a current time of day, a current time of year, an existence of a known cyber-security attack, a battery state, or a combination or subset thereof. For example, the transition to the frequency scanning mode 315 may be based on whether a current location of the device 205 is in an urban area or a rural area or based on whether the current location of the device 205 is within or proximate to an area associated with a recently detected cyber-security attack. Alternatively or in addition, the transition to the frequency scanning mode 315 may be based on a user role, an incident type, or both. For example, a user with higher security privileges may be more likely to be a target of a cyber-security attack than a user with lower security privileges. Also, cyber-security attacks may be more likely in certain types of incidents. For example, a cyber-security attack may be more likely when a riot or other planned incident occurs as compared to when a weather incident occurs. Similarly, the current time of day or year may also be used to determine whether to transition to the frequency scanning mode 315. For example, cyber-security attacks may be more likely during particular hours of a day or particular times of the year.

In some embodiments, the current battery state may also be used to determine whether to transition to the frequency scanning mode 315. For example, a rule may look for sufficient available power to perform a frequency scan. In this respect, in some embodiments, the current battery state may be used as a deciding factor, wherein a security feature (the frequency scanning feature) is enabled only when the device 205 has sufficient battery charge.

In the frequency scanning mode 315, the frequency scanning feature is enabled, and a frequency scan is performed. The results of this scan in combination with one or more environmental context parameters may be used to determine whether the frequency hopping security feature should be enabled (whether the device 205 should transition to the frequency hopping mode 320 or the frequency scanning and hopping mode 325 as illustrated in FIG. 3). For example, the scan results and one or more environmental context parameters may be used to determine a level of the potential threat. In some embodiments, the potential threat may have a low level of risk, a medium level of risk, or a high level of risk. When the threat has a low level of risk (for example, no intrusion detected via the frequency scan), the device 205 may remain in the frequency scanning mode 315. Alternatively, when the threat has a medium or high level of risk, the device 205 may transition to the frequency hopping mode 320 or the frequency scanning and hopping mode 325. In some embodiments, the decision between whether to transition to the frequency hopping mode 320 or the frequency scanning and hopping mode 325 may be based on current battery state. For example, when the scan detected an intrusion and the current battery state is sufficient to perform frequency hopping, the device 205 may transition to the frequency scanning and hopping mode 325. Alternatively, when the scan detected an intrusion, but the current battery state is sufficient to perform frequency hopping but is below a predetermined threshold, the device 205 may transition to the frequency hopping mode 320 where frequency scanning is disabled (for example, to conserve battery power). It will be appreciated that other environmental context parameters may be used as part of the decision regarding a level of risk associated with the potential threat and the scan results and battery state are provided as one example.

As illustrated in FIG. 3, when the device 205 is operating in the frequency scanning mode 315, the frequency hopping mode 320, or the frequency scanning and hopping mode 325, the potential threat that triggered the transition to one of these modes is evaluated to determine whether the threat has cleared. In some embodiments, this determination is similar to the original determination of whether the threat exists (for example, the determination of whether to initially transition to the frequency scanning mode 315). In response to detecting that the threat has cleared, the device 205 may transition to the disabled mode 305, where the frequency scanning feature and the frequency hopping feature are disabled. Alternatively, in response to detecting that the threat has not cleared, the device 205 may remain in its current security mode or may transition to a different security mode. For example, if a potential threat remains uncleared, the device 205 may transition to a security mode associated with an enhanced security risk or threat. In particular, the longer an identified potential threat exists without being cleared, the more security features may be needed to detect and prevent a cyber-security attack. Alternatively, when an identified potential threat remains uncleared, the device 205 may transition to a security mode associated with a lower security or risk or threat. Again, the rules controlling security mode transitions may vary to account for historical trends in cyber-security attacks.

The security mode transitions described above occur during operation of the device 205 and the device 205 may cycle through one or more of the modes based on the evaluated one or more environmental context parameters.

Figure 4:
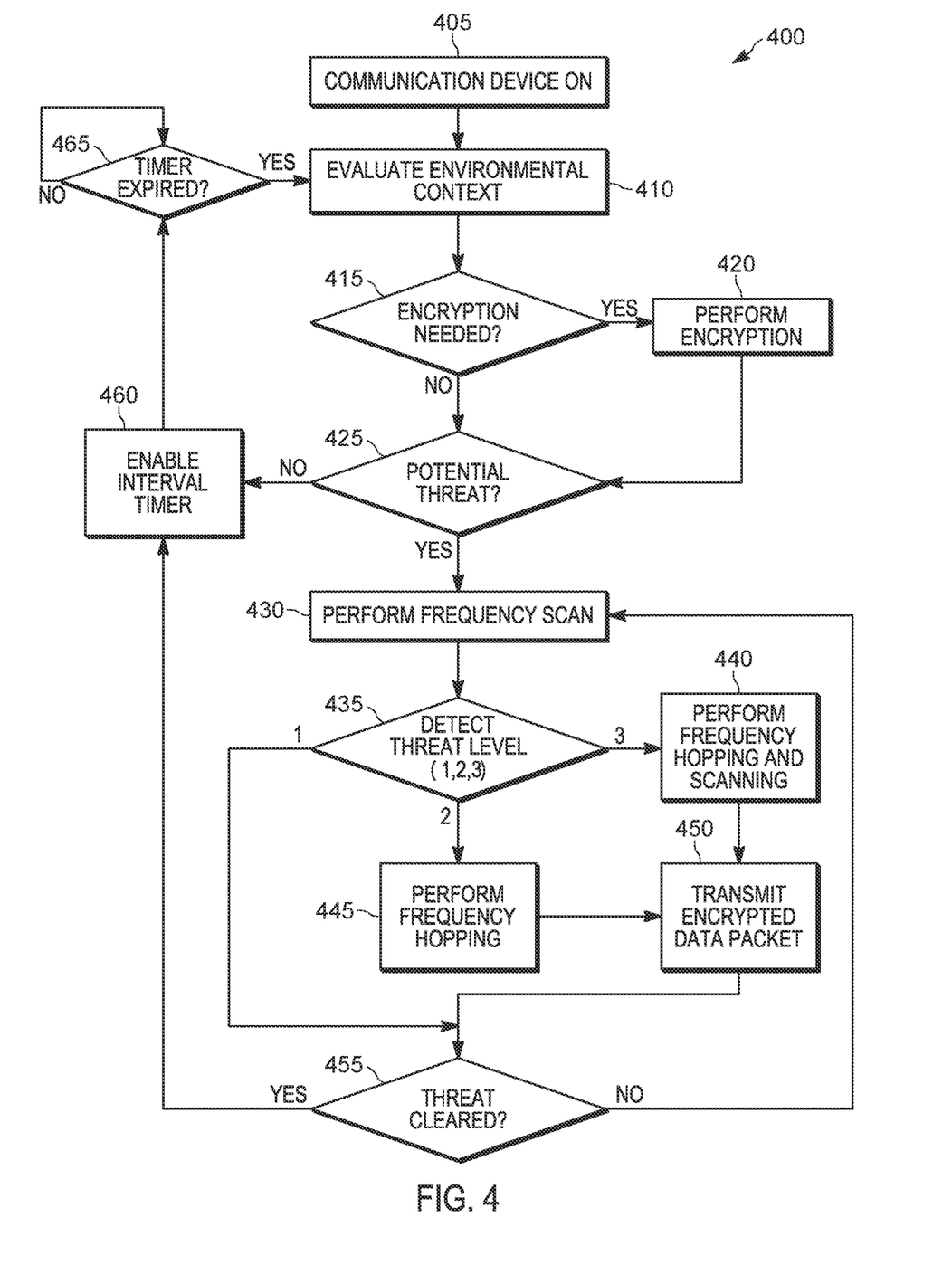
FIG. 4 is a flowchart illustrating a method of operating a wireless communication device to dynamically enable a security feature in accordance with some embodiments.

For example, FIG. 4 is a flowchart showing a method 400 of operating the first wireless communication device 205 to dynamically enable a security feature of the device 205 (for example, using the security modes described above). The method 400 is described herein as being performed by the device 205 and, in particular, via the electronic processor 110 executing instructions. The functionality, however, may be distributed among multiple electronic processors included in the device 205 or may be performed by one or more electronic processors included in a device external to the device 205. For example, the functionality of the method 400 or portions thereof may be performed as a hosted or cloud service provided by a device or system remote from the device 205.

As illustrated in FIG. 4, when the device 205 is powered on (at block 405), the device 205 is operated in the disabled mode 305 wherein the frequency scanning feature and the frequency hopping feature of the device 205 are disabled. In some embodiments, when the device 205 is powered on, the encryption feature of the device 205 is also disabled.

While operating in the disabled mode, the device 205 evaluates one or more environmental context parameters associated with the first wireless communication device 205 (at block 410). As described above, the environmental context parameters are evaluated based on sensor data, stored data, remotely accessed data, or a combination thereof. As illustrated in FIG. 4, the device 205 determines whether encryption is needed based on the evaluated environmental context (at block 415). As noted above, in some embodiments, this determination is based on voice data, user role, location, the existence of other cyber-security attacks, or a combination or subset thereof. In response to determining that encryption is needed (at block 415), the encryption feature is enabled by transitioning the device to the encryption mode 310 (at block 420).

Regardless of whether the encryption feature was enabled, the device 205 determines, based on the evaluated one or more environmental context parameters, whether communications of the first wireless communication device 205 are susceptible to a potential cyber-security threat (at block 425). Again, as noted above, in some embodiments, this determination is based on location, user role, incident type, battery state, the existence of other cyber-security attacks, or a combination or subset thereof. In response to determining the communications of the first wireless communication device 205 are susceptible to the potential cyber-security threat (at block 425), the device 205 transitions to the frequency scanning mode 315 and, with the frequency scan feature enabled, performs a frequency scan to identify whether the potential cyber-security threat is present (at block 430). In some embodiments, the scanning profile, frequency, or both of the scan may also be dynamically set based on the one or more environmental context parameters. For example, the frequencies scanned, the frequency, or both may be set or modified based on the location, the user role, the current time of day, the current time of day, or a combination or subset thereof. In some embodiments, the scanned frequencies include Wi-Fi® bands, Bluetooth® or Bluetooth Low Energy bands, or a combination thereof.

Based on the results of the frequency scan, the one or more environmental context parameters, or a combination therefore, the device 205 determines a level of risk associated with the potential threat (at block 435). As noted above, the level of risk may be selected from three available levels, but other numbers of levels may be used. In the embodiment illustrated in FIG. 4, the levels of risk include a first (1) or low risk level, a second (2) or medium risk level, and a third (3) or high risk level.

In some embodiments, when the frequency scan did not detect the potential threat (no devices were detected that are not supposed to be on the network 215), the device 205 may assign the potential threat to the first (1) risk. Alternatively, when the frequency scan did detect the potential threat (a device was detected that is not supposed to be on the network 215), the device 205 may assign the potential threat to the second (2) level or to the third (3) level to automatically enable frequency hopping and a change to the transmission frequency of the device 205 to prevent interception of secure communications by unauthorized third parties. In some embodiments, the determination regarding whether to assign the potential threat to the second (2) or third (3) level may be based on the one or more environmental context parameters. For example, when a known cyber-security attack exists in the area, when a user associated with the device 205 has a particular user role, or when the incident type is a particular type, the device 205 may be configured (through the rules defining mode transitions) to assign the potential threat to the third (3) level of risk. In other embodiments, when a potential threat was detected during the frequency scan, the device 205 may be configured to assign the threat to the third (3) level of risk unless the state of charge of the battery 102 is below a predetermined threshold.

As illustrated in FIG. 4, in response to the potential threat being assigned to the first (1) level (for example, representing a minimal risk), the device 205 remains in the frequency scanning mode 315. In response to the potential threat being assigned to the second (2) level, the device 205 transitions to the frequency hopping mode 320 (at block 440). In response to the potential threat being assigned to the third (3) level, the device 205 transitions to the frequency scanning and hopping mode 325 (at block 445).

When frequency hopping is enabled, devices communicating with the device 205 (for example, the second wireless communication device 210 as illustrated in FIG. 2) are informed that that frequency hopping has been enabled with respect to the device 205 and are informed of the pattern of frequencies, voice channels, or both being cycled through by the device 205. In some embodiments, the device 205 performs this notification by transmitting a data packet (for example, an encrypted data packet) to intended receiving communication devices (at block 450). The data packet may include a secret frequency hopping pattern being used by the first wireless communication device 205.

As illustrated in FIG. 4, after assigning the potential threat a level of risk and transitioning to an appropriate security mode (as needed), the device 205 determines whether the potential threat has been cleared (at block 455). This determination may be similar to the determination regarding whether a potential threat exists as described above with respect to block 425. In response to the potential threat being cleared (at block 455), the device 205 may transition to the disabled mode (disabling frequency scanning and frequency hopping) and enable an interval timer (at block 460). The interval timer sets an expiration time at which time the device 205 returns to re-evaluate the environmental context (at blocks 465 and 410).

Alternatively, in response to the potential threat not being cleared (at block 455), the device 205 returns to monitoring the potential threat (at block 430). As noted above, in some embodiments, when a potential threat has not been cleared, a higher level of security may be implemented in the next cycle. For example, when a potential threat has not been cleared in one or more cycles through block 455, the device 205 may be configured to assign the potential threat a higher level of risk to enable other security features, such as frequency hopping, even when the results of the frequency scan otherwise do not warrant such enablement. Accordingly, in some embodiments, the device 205 may be configured to track a number of cycles through block 435 and use this count as part of assigning a level of risk.

Accordingly, embodiments described herein provide methods and systems for dynamically enabling (and optionally disabling) one or more security features of a wireless communication device based on environmental context. As noted above, this dynamically enablement (and disablement) of security features allows a device to detect and prevent cyber-security attacks while addressing battery and latency issues associated with the security features. For example, as compared to keeping the security features consistently enabled, the dynamic enablement and disablement allows security features to be used when needed but disabled when not needed to preserve battery life and reduce latency and complexity.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A wireless communication device comprising:
an electronic processor configured to:
operate the wireless communication device in a first security mode of a plurality of available security modes, a frequency scanning feature and a frequency hopping feature of the wireless communication device being disabled in the first security mode,
evaluate one or more environmental context parameters associated with the wireless communication device, wherein the one or more environmental context parameters include a role of a user associated with the wireless communication device,
determine, based on the evaluated one or more environmental context parameters, whether communications of the wireless communication device are susceptible to a potential cyber-security threat, and
in response to determining the communications of the wireless communication device are susceptible to the potential cyber-security threat, transition the wireless communication device to a second security mode of the plurality of available security modes to determine whether the potential cyber-security threat is present, at least one selected from a group consisting of the frequency scanning feature and the frequency hopping feature being enabled in the second security mode.

2. The wireless communication device of claim 1, wherein the one or more environmental context parameters include at least one selected from a group consisting of a location of the wireless communication device, a current time of year, and a current time of day.

3. The wireless communication device of claim 1, wherein the one or more environmental context parameters include a type of incident associated with the wireless communication device.

4. The wireless communication device of claim 1, wherein the one or more environmental context parameters include audio data received via a microphone included in the wireless communication device and wherein the electronic processor is configured to evaluate the audio data using audio analysis, the audio data including a voice communication transmitted via a transceiver included in the wireless communication device.

5. The wireless communication device of claim 1, wherein the one or more environmental context parameters include a state of a battery included in the wireless communication device.

6. The wireless communication device of claim 1, wherein the frequency scanning feature is enabled and the frequency hopping feature is disabled in the second security mode.

7. The wireless communication device of claim 6, wherein the electronic processor is further configured to perform, while operating the wireless communication device in the second security mode, a frequency scan and transition the wireless communication device to a third security mode of the plurality of available security modes based on at least one selected from a group consisting of the one or more environmental context parameters and a result of the frequency scan, the frequency hopping feature being enabled and the frequency scanning feature being disabled in the third security mode.

8. The wireless communication device of claim 6, wherein the electronic processor is further configured to perform, while operating the wireless communication device in the second security mode, a frequency scan and transition the wireless communication device to a third security mode of the plurality of available security modes based on at least one selected from a group consisting of the one or more environmental context parameters and a result of the frequency scan, the frequency hopping feature and the frequency scanning feature being enabled in the third security mode.

9. The wireless communication device of claim 6, wherein the electronic processor is further configured to perform, while operating the wireless communication device in the second security mode, a frequency scan and maintain the wireless communication device in the second security mode based on at least one selected from a group consisting of the one or more environmental context parameters and a result of the frequency scan.

10. The wireless communication device of claim 6, wherein the electronic processor is further configured to perform, while operating the wireless communication device in the second security mode, a frequency scan and transition the wireless communication device to the first security mode based on at least one selected from a group consisting of the one or more environmental context parameters and a result of the frequency scan.

11. The wireless communication device of claim 1, wherein the electronic processor is further configured to transmit an encrypted data packet to a second wireless communication device in response to transitioning the wireless communication device to one of the plurality of available security modes having the frequency hopping feature enabled, the encrypted data packet including a secret frequency hopping pattern.

12. The wireless communication device of claim 1, wherein the electronic processor is further configured to determine whether encryption is needed based on the evaluated one or more environmental context parameters and enable an encryption feature of the wireless communication device in response to determining that encryption is needed based on the evaluated one or more environmental context parameters.

13. A method of operating a wireless communication device, the method comprising:
  operating, with an electronic processor included in the wireless communication device, the wireless communication device in a first security mode of a plurality of available security modes, a frequency scanning feature and a frequency hopping feature of the wireless communication device being disabled in the first security mode;
  evaluating, with the electronic processor, one or more environmental context parameters associated with the wireless communication device, wherein the one or more environmental context parameters include a role of a user associated with the wireless communication device;
  determining, with the electronic processor, based on the evaluated one or more environmental context parameters, whether communications of the wireless communication device are susceptible to a potential cyber-security threat;
  in response to determining the communications of the wireless communication device are susceptible to the potential cyber-security threat, transitioning, with the electronic processor, the wireless communication device to a second security mode of the plurality of available security modes to identify whether the potential cyber-security threat is present, the frequency scanning feature being enabled and the frequency hopping feature being disabled in the second security mode;
  performing, with the electronic processor while the wireless communication device operates in the second security mode, a frequency scan; and
  in response to detecting the potential cyber-security threat from the frequency scan, transitioning, with the electronic processor, the wireless communication device to a third security mode of the plurality of available security modes, the frequency hopping feature being enabled in the third security mode.

14. The method of claim 13, wherein the frequency hopping feature and the frequency scanning feature are enabled in the third security mode and at least one of a frequency and a scanning profile of the frequency scanning feature are modified in the third security mode as compared to the second security mode.

15. The method of claim 13, further comprising:
  determining, with the electronic processor, whether the potential cyber-security threat has cleared; and
  in response to the potential cyber-security threat being cleared, transitioning the wireless communication device to the first security mode and re-evaluating the one or more environmental context parameters.

16. The method of claim 13, further comprising:
  determining, with the electronic processor, whether the potential cyber-security threat has cleared; and
  in response to the potential cyber-security threat not being cleared, transitioning the wireless communication device to the second security mode.

17. Non-transitory computer-readable medium storing instructions, that when executed by an electronic processor, perform a set of functions, the set of functions comprising:
operating a wireless communication device in a first security mode of a plurality of available security modes;
evaluating, based on sensor data, one or more environmental context parameters associated with the wireless communication device, wherein the one or more environmental context parameters include a role of a user associated with the wireless communication device;
determining, based on the evaluated one or more environmental context parameters, whether communications of the wireless communication device are susceptible to a potential cyber-security threat;
in response to determining the communications of the wireless communication device are susceptible to the potential cyber-security threat, transitioning the wireless communication device to a second security mode of the plurality of available security modes, a frequency scanning feature of the wireless communication device being enabled in the second security mode;
performing a frequency scan while operating the wireless communication device in the second security mode to identify whether the potential cyber-security threat is present; and
automatically and selectively operating the wireless communication device in one of three security modes included in the plurality of available security modes based on the one or more environmental context parameters and a result of the frequency scan, the three security modes including:
(i) the second security mode,
(ii) a third security mode, a frequency hopping feature of the wireless communication device being enabled and the frequency scanning feature being disabled in the third security mode, and
(iv) a fourth security mode, the frequency hopping feature and the frequency scanning feature being enabled in the fourth security mode.

18. The non-transitory computer-readable medium of claim 17, wherein at least one of a frequency and a scan profile of the frequency scanning feature are modified in the fourth security mode as compared to the second security mode.

19. The non-transitory computer-readable medium of claim 17, wherein the set of functions further comprises:
determining whether the potential cyber-security threat has cleared; and
in response to the potential cyber-security threat being cleared, transitioning the wireless communication device to the first security mode and re-evaluating the one or more environmental context parameters.

20. The non-transitory computer-readable medium of claim 17, wherein the one or more environmental context parameters include at least one selected from a group consisting of a location of the wireless communication device, a role of a user associated with the wireless communication device, a current time of year, a current time of day, a type of incident associated with the wireless communication device, voice data, and a state of a battery included in the wireless communication device.

* * * * *